US010955993B2

(12) United States Patent
Ota et al.

(10) Patent No.: US 10,955,993 B2
(45) Date of Patent: Mar. 23, 2021

(54) IMAGE PROCESSING APPARATUS, METHOD FOR PROCESSING INFORMATION, AND NON-TRANSITORY COMPUTER READABLE MEDIUM STORING PROGRAM FOR ADDING COMMENTS TO IMAGE INFORMATION

(71) Applicant: FUJI XEROX CO., LTD., Tokyo (JP)

(72) Inventors: Kiko Ota, Kanagawa (JP); Yasunari Kishimoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 494 days.

(21) Appl. No.: 15/084,625

(22) Filed: Mar. 30, 2016

(65) Prior Publication Data
US 2017/0115834 A1    Apr. 27, 2017

(30) Foreign Application Priority Data

Oct. 27, 2015  (JP) .............................. JP2015-210427

(51) Int. Cl.
*G06F 3/0482*  (2013.01)
*G06F 40/30*   (2020.01)
(Continued)

(52) U.S. Cl.
CPC ........ *G06F 3/0482* (2013.01); *G06F 3/04817* (2013.01); *G06F 3/04847* (2013.01);
(Continued)

(58) Field of Classification Search
CPC .......... G06F 3/048; G06F 17/00; G06F 40/00; H04L 41/06; G11B 27/34
See application file for complete search history.

(56) References Cited

U.S. PATENT DOCUMENTS 5,666,578 A *  9/1997  Oikawa .................. G03B 17/20
                                                    396/319
8,984,405 B1 *  3/2015  Geller .................... G11B 27/34
                                                    715/719
(Continued)

FOREIGN PATENT DOCUMENTS

JP   H08-297554 A   11/1996
JP   2000-105731 A   4/2000
(Continued)

OTHER PUBLICATIONS

Oct. 25, 2019 Office Action issued in Japanese Patent Application No. 2015-210427.

*Primary Examiner* — Jennifer N To
*Assistant Examiner* — Qi Wan
(74) *Attorney, Agent, or Firm* — Oliff PLC

(57) ABSTRACT

Provided is an information processing apparatus including an input section that inputs a comment to be added to image information or document information, a selecting section that selects a type of the comment among plural types which are set in advance, based on a content of the comment input by the input section, a generating section that generates a pattern graphic corresponding to the type of the comment selected by the selecting section, and an adding section that adds the pattern graphic generated by the generating section to a position which is designated in the image information or the document information.

11 Claims, 20 Drawing Sheets

(51) Int. Cl.
*G06F 40/42* (2020.01)
*G06F 3/0481* (2013.01)
*G06F 40/169* (2020.01)
*G06F 40/242* (2020.01)
*G06F 40/284* (2020.01)
*G06F 3/0484* (2013.01)

(52) U.S. Cl.
CPC .......... *G06F 40/169* (2020.01); *G06F 40/242* (2020.01); *G06F 40/284* (2020.01); *G06F 40/30* (2020.01); *G06F 40/42* (2020.01)

(56) References Cited

U.S. PATENT DOCUMENTS

| | | | | |
|---|---|---|---|---|
| 9,189,818 | B2 * | 11/2015 | McClements, IV | G06Q 10/101 |
| 2006/0085758 | A1 * | 4/2006 | Backus | H04L 41/06 715/772 |
| 2006/0212831 | A1 * | 9/2006 | Fogg | G06Q 10/10 715/835 |
| 2007/0300164 | A1 * | 12/2007 | Bhogal | G06Q 10/109 715/753 |
| 2010/0100904 | A1 * | 4/2010 | Kawakami | H04N 7/17318 725/37 |
| 2010/0123724 | A1 * | 5/2010 | Moore | H04M 1/72547 345/473 |
| 2011/0078167 | A1 * | 3/2011 | Sundaresan | G06F 17/2785 707/765 |
| 2012/0066581 | A1 * | 3/2012 | Spalink | G06F 17/241 715/232 |
| 2012/0150997 | A1 * | 6/2012 | McClements, IV | G06Q 10/101 709/217 |
| 2012/0260201 | A1 * | 10/2012 | Ganesh | G06Q 30/0201 715/764 |
| 2014/0053071 | A1 * | 2/2014 | Penner | G06Q 10/10 715/732 |
| 2014/0201613 | A1 * | 7/2014 | Della Corte | G06F 3/04817 715/233 |
| 2014/0214510 | A1 * | 7/2014 | Karri | G06Q 30/0217 705/14.19 |
| 2014/0337126 | A1 * | 11/2014 | Ohanyan | G06Q 30/0251 705/14.49 |
| 2015/0109342 | A1 * | 4/2015 | Ohki | G06F 17/30058 345/660 |

FOREIGN PATENT DOCUMENTS

| | | |
|---|---|---|
| JP | 2006-350554 A | 12/2006 |
| JP | 2007-172173 A | 7/2007 |
| JP | 2008-278088 A | 11/2008 |
| JP | 2010-114571 A | 5/2010 |
| JP | 2014-013284 A | 1/2014 |
| JP | 2014-106560 A | 6/2014 |

* cited by examiner

FIG. 4

| TYPE OF COMMENT | KEYWORD | TYPE OF COMMENT | KEYWORD |
|---|---|---|---|
| SENSE OF MATERIAL QUALITY | TEXTURE, MATERIAL QUALITY, MATERIAL TOUCH, GLOSS, WHITENESS, PAPER, ... | PATTERN | PATTERN, ... |
| COLOR | COLOR SCHEME, COLOR, COLOR TASTE, HUE, COLORATION, ... | ILLUSTRATION | ILLUSTRATION, ... |
| CUD | COLOR UNIVERSAL DESIGN, COLOR BLINDNESS, COLOR WEAKNESS, ... | ... | ......... |
| CHARACTER | CHARACTER, FONT, ... | ... | ......... |

EXAMPLE OF DESIGN IMAGE

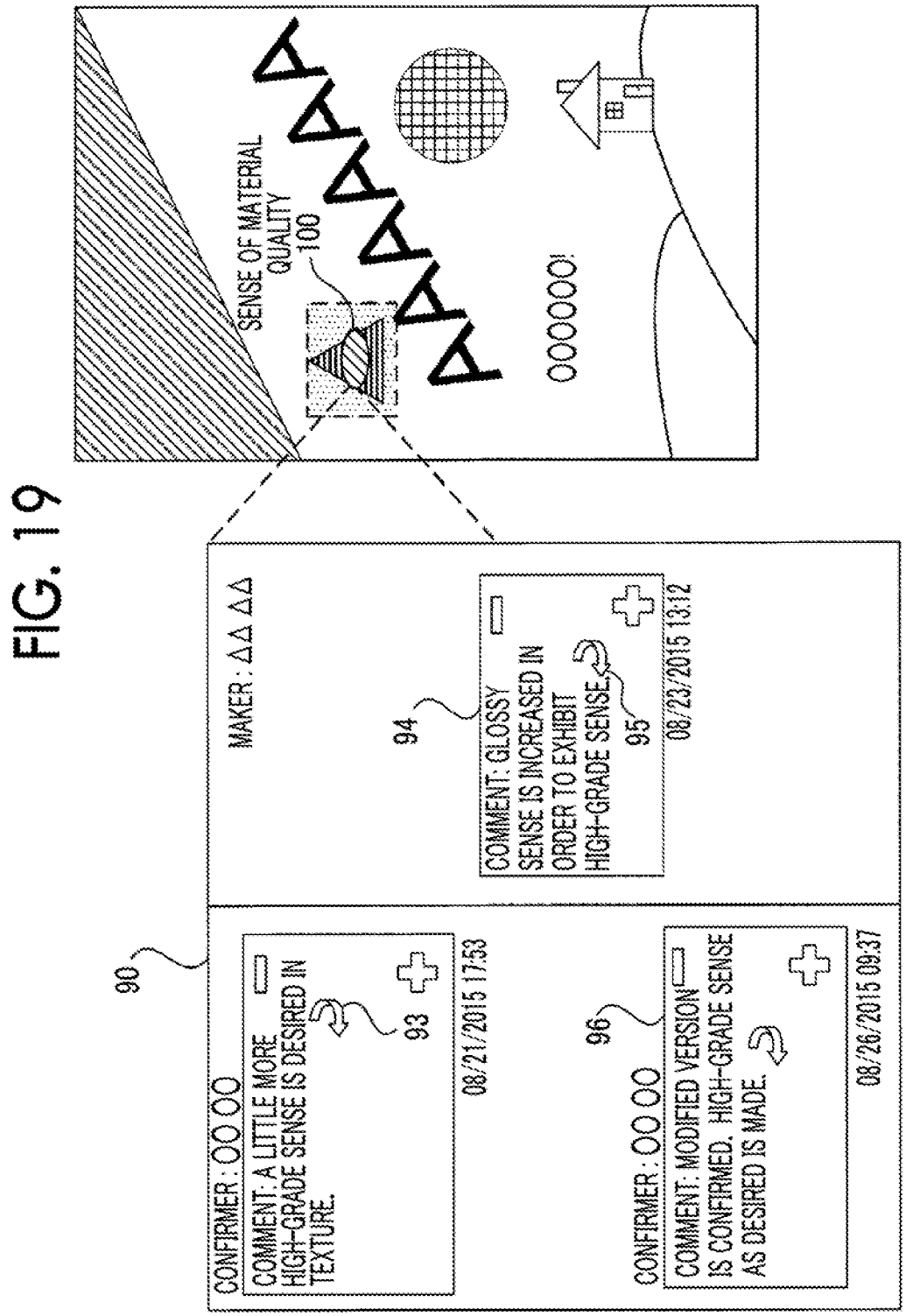

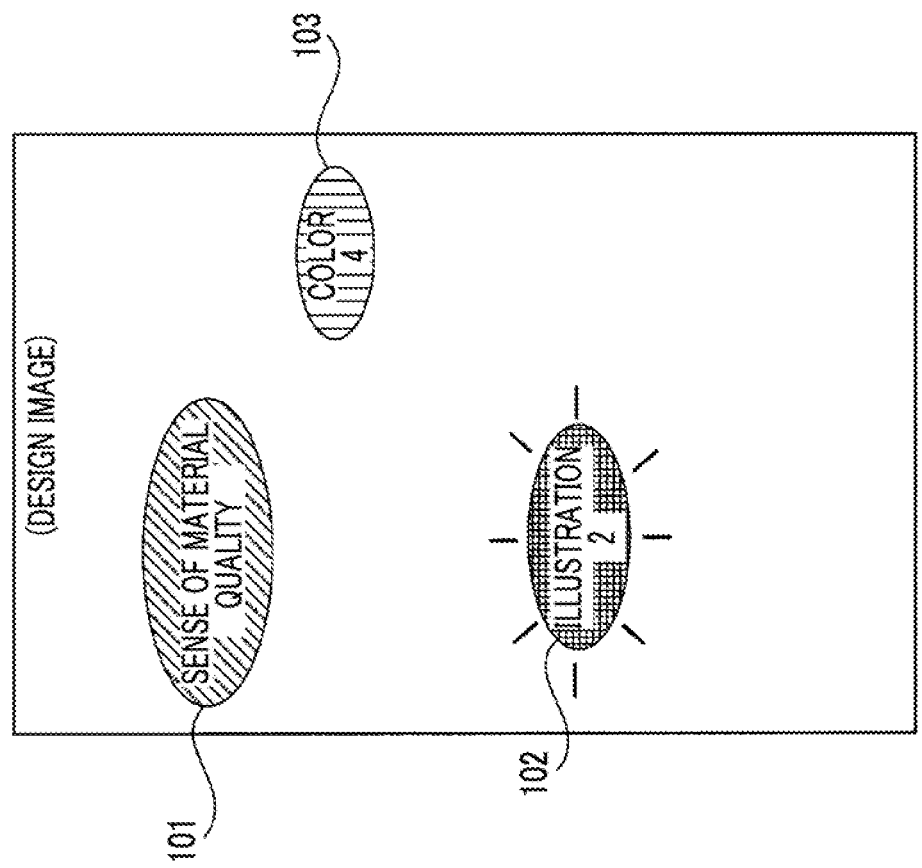

IMAGE PROCESSING APPARATUS, METHOD FOR PROCESSING INFORMATION, AND NON-TRANSITORY COMPUTER READABLE MEDIUM STORING PROGRAM FOR ADDING COMMENTS TO IMAGE INFORMATION

CROSS-REFERENCE TO RELATED APPLICATIONS

This application is based on and claims priority under 35 USC 115 from Japanese Patent Application No. 2015-210427 filed Oct. 27, 2015.

BACKGROUND

Technical Field

The present invention relates to an information processing apparatus, a method for processing information, and a non-transitory computer readable medium, storing a program.

In a process of making various types of images such as a design image, there is a case where the image is modified or changed while being confirmed by being exchanged between plural users in the middle of making the image. In such a case, it is performed such that data of the image is sent to another user in the middle of making the image, and the user who receives image data attaches a tag to which a comment is written into the image data, or writes the comment directly into the image data and returns the image data to a writer, or transfers the image data to other users.

However, when such a method is used, if the number of the attached tags or the number of the written comments becomes large, it is difficult to grasp which comment relates to what content. Therefore, it is also performed such that color of the tag is changed per content of the comment, or colors of characters which are written as a comment are changed.

However, in case of performing to select the type of the comment per writer of the comment, there is a problem that the type of the selected comment is changed per writer of the comment. Therefore, it is difficult to grasp which color of the tag relates to what comment, or which color of the characters of the comment relates to what comment. In particular, if the number of the attached tags or the number of the written comments becomes large, there is a problem that the user who receives the image data with the comment may not easily grasp the type of the comment.

SUMMARY

According to an aspect of the invention, there is provided an information processing apparatus including:

an input section that inputs a comment to be added to image information or document information;

a selecting section that selects a type of the comment among plural types which are set in advance, based on a content of the comment input by the input section;

a generating section that generates a pattern graphic corresponding to the type of the comment selected by the selecting section; and an adding section that adds the pattern graphic generated by the generating section to a position which is designated in the image information or the document information.

BRIEF DESCRIPTION OF THE DRAWINGS

Exemplary embodiments of the present invention will be described in detail based on the following figures, wherein:

FIG. 4 is a diagram for describing an example of a keyword which is stored in a keyword storing section;

FIG. 19 is a diagram illustrating a display example of case where the comment is further added to case to which the reply comment is added; and FIG. 20 is a diagram illustrating a display screen example of case where plural icons are added into one design image.

DETAILED DESCRIPTION

Next, exemplary embodiments of the invention will be described in detail with reference to the drawings.

Figure 1:
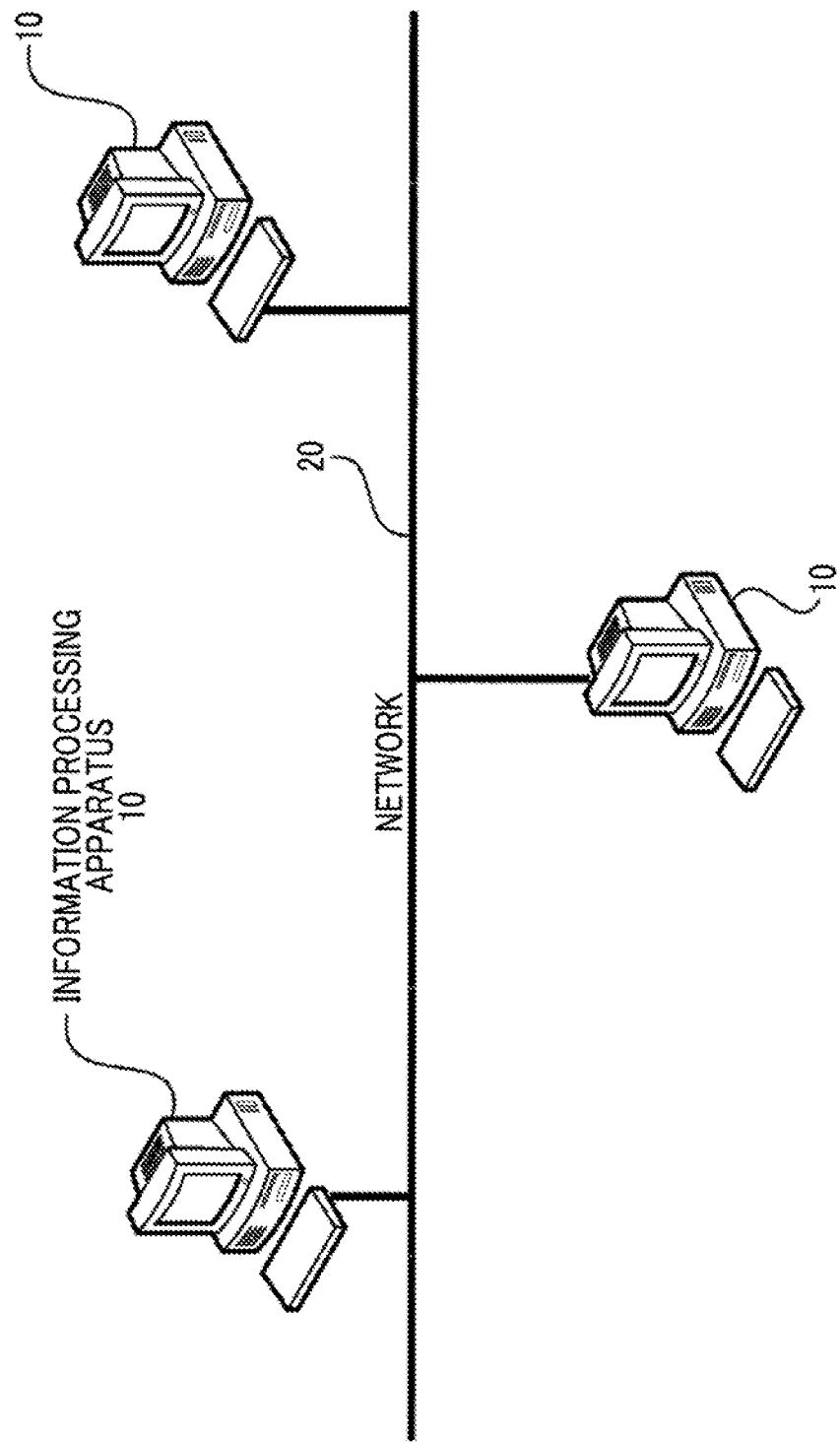
FIG. 1 is a diagram illustrating a system configuration of an information processing system according to an exemplary embodiment of the indention.

FIG. 1 is a system diagram illustrating a configuration of an information processing system according to an exemplary embodiment of the invention.

As illustrated in FIG. 1, the information processing system according to the embodiment of the invention is configured by plural information processing apparatuses 10 such as personal computers which are connected to each other by a network 20. In the plural information processing apparatuses 10, the same image management softwares are respectively installed, and the plural information processing apparatuses 10 are configured to exchange image data (image information) by sending the image data to each other and receiving the image data from each other.

In the exemplary embodiment, description of a case where a comment is added to the image data such as a graphic image or a photographic image is performed, but the invention is applicable to a case where the comment is added to document data (document information).

Figure 2:
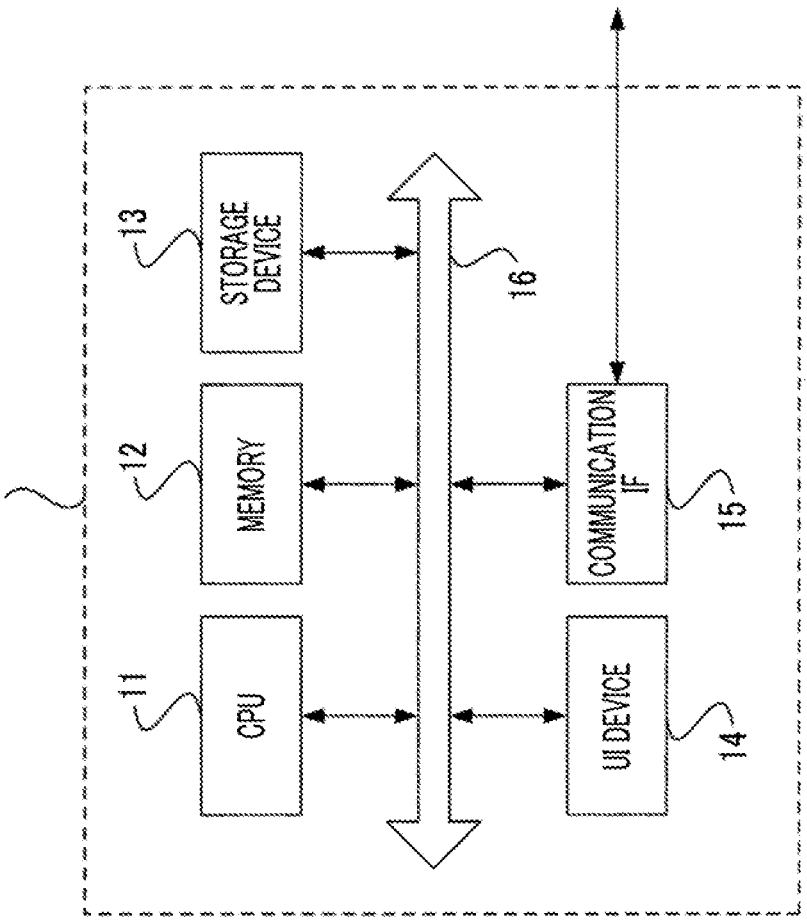
FIG. 2 is a block diagram illustrating a hardware configuration of an information processing apparatus in the exemplary embodiment of the invention.

Next, FIG. 2 illustrates a hardware configuration of the information processing apparatus 10 in the information processing system according to the exemplary embodiment.

As illustrated in FIG. 2, the information processing apparatus 10 includes a CPU 11, a memory 12, a storage device 13 such as a hard disk drive (HDD), a user interface (UI) device 14 that includes a touch panel, or a liquid crystal display and a keyboard, and a communication interface (IF) 15 that performs the sending and the receiving of the data between terminal devices 20A to 20C through a network 30. The components are connected to each other through a control bus 16.

The CPU 11 executes a predetermined processing based on a control program which is stored in the memory 12 or the storage device 13, and controls an operation of the information processing apparatus 10. In the exemplary embodiment, the CPU 11 is described as a case where the CPU 11 executes the control program by reading out the control program which is stored in the memory 12 or the storage device 13, but it is possible to provide the program, to the CPU 11 by storing the program in a storage medium such as a CD-ROM.

Figure 3:
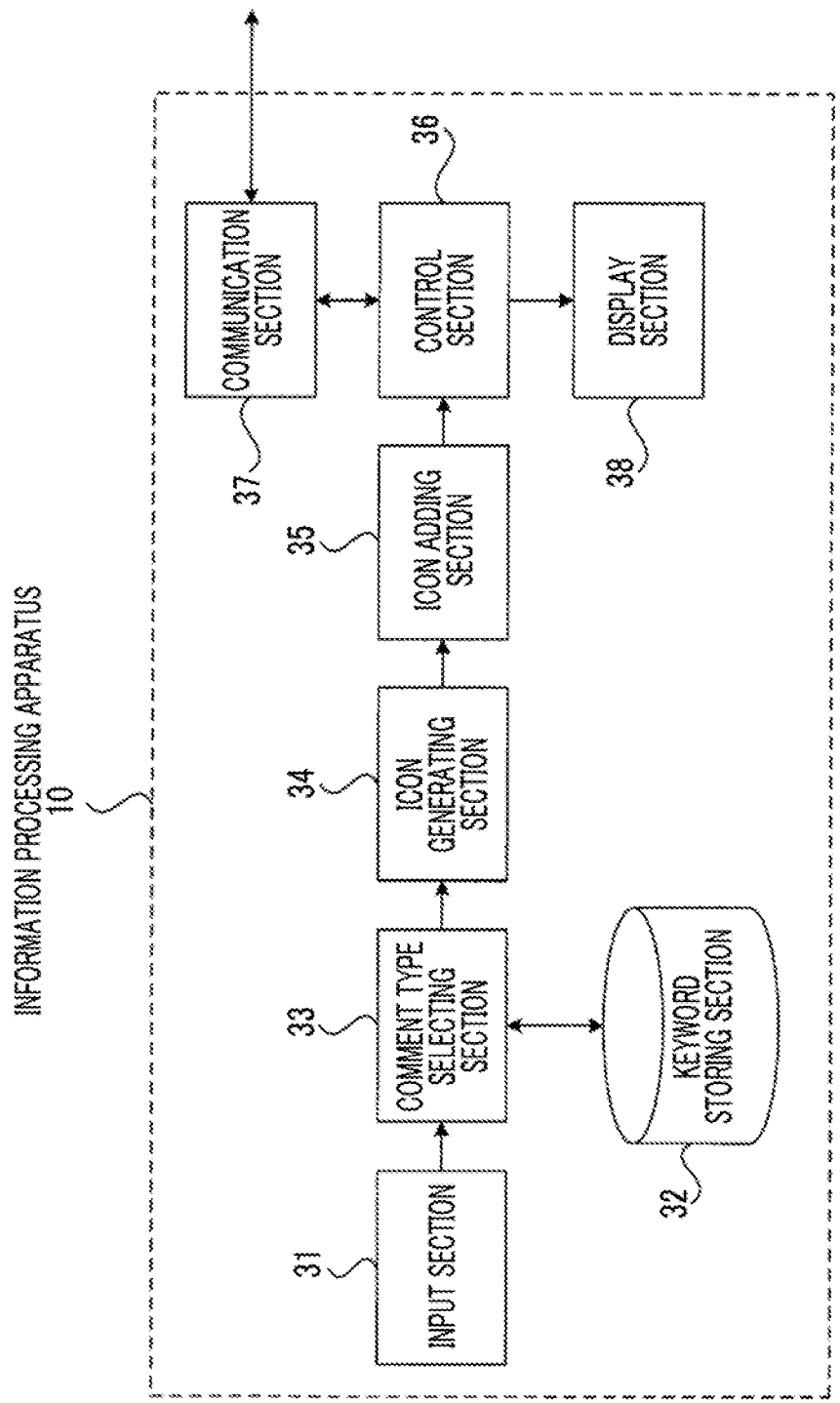
FIG. 3 is a block diagram illustrating a functional configuration of the information processing apparatus in the exemplary embodiment of the invention.

FIG. 3 is a block diagram, illustrating a functional configuration of the information processing apparatus 10 which is achieved by executing the above control program.

As illustrated in FIG. 3, the information processing apparatus 10 of the exemplary embodiment includes an input section 31, a keyword storing section 32, a comment type selecting section 33, an icon generating section 34, an icon adding section 35, a control section 36, a communication section 37, and a display section 38.

The input section 31 inputs the comment to be added to the image data through the user interface device such as the keyboard.

In the keyword storing section 32, a keyword (word) for specifying the type of the comment is stored per type of the comment. An example of the keyword which is stored in the keyword storing section 32 will be described with reference to FIG. 4.

In the exemplary embodiment, since the image data to which the comment is added is described by using a case of being a design image such as a poster for advertisement, in the example illustrated in FIG. 4, the types of "sense of material quality", "color", "color universal design (CUD)", "character", "pattern", "illustration" . . . and the like are set as a type of the comment.

The type of the comment referred to as "sense of material, quality" indicates a case where the comment relates to a sense of material quality of the design image. Moreover, the types of the comments referred to as "color", "CUD", "character", "pattern", and "illustration" respectively indicate cases where the comments relate to color, CUD, a character, a pattern, and an illustration of the design image.

In the example illustrated in FIG. 4, the words such as "texture", "material quality", "material", "touch", "gloss", "whiteness", and "paper" are registered as a keyword regarding the type of the comment referred to as "sense of material quality". Similarly, the words such as "color scheme", "color", "color taste", "hue", and "coloration" are registered as a keyword regarding the type of the comment referred to as "color", and the words such as "color universal design", "color blindness", and "color weakness" are registered as a keyword regarding the type of the comment referred to as "CUD".

The comment type selecting section 33 selects the type of the comment among plural types which are set in advance, based on a content of the comment input by the input section 31. Specifically, the comment type selecting section 33 selects the type of the comment, based on whether or not the word stored by the keyword storing section 32 is included in the comment input by the input section 31.

For example, when the word referred to as "gloss" is included in the comment input by the input section 31, the comment type selecting section 33 selects the type of the comment referred to as "sense of material quality".

The icon generating section 34 generates an icon (pattern graphic) corresponding to the type of the comment selected by the comment type selecting section 33.

Figure 5:
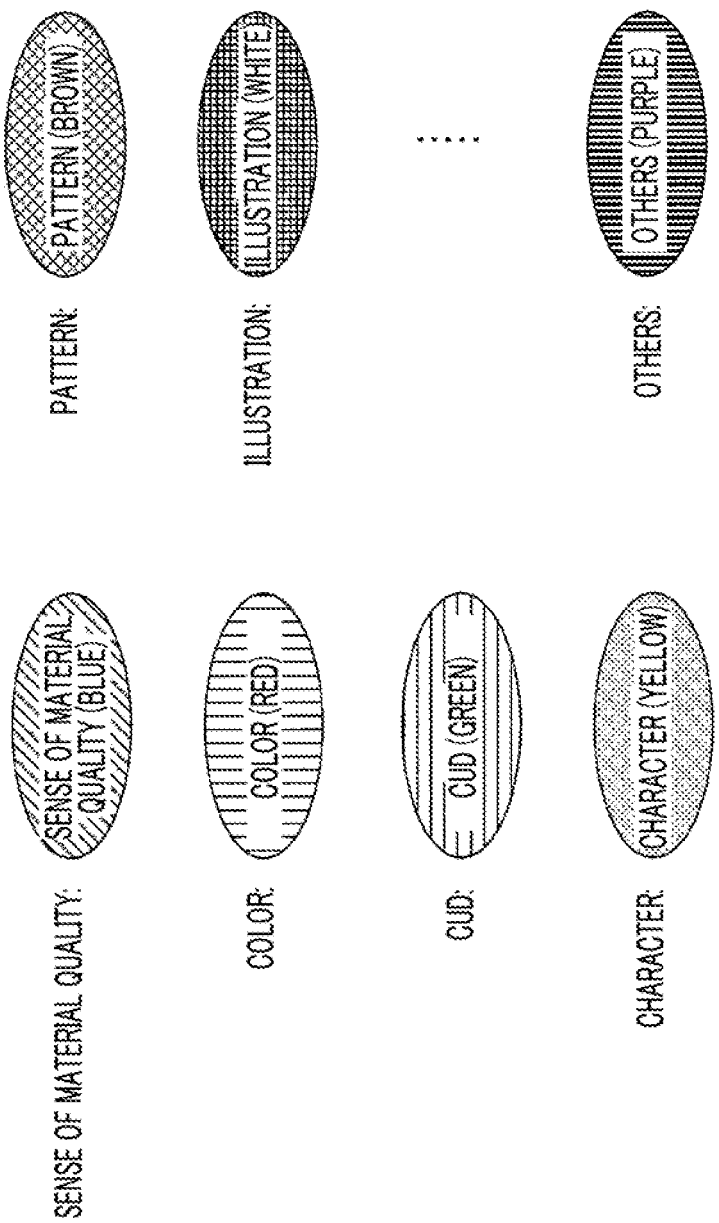
FIG. 5 is a diagram illustrating an example of case where icons of plural types which are different from each other in coloration respond to types of comments.
Figure 6:
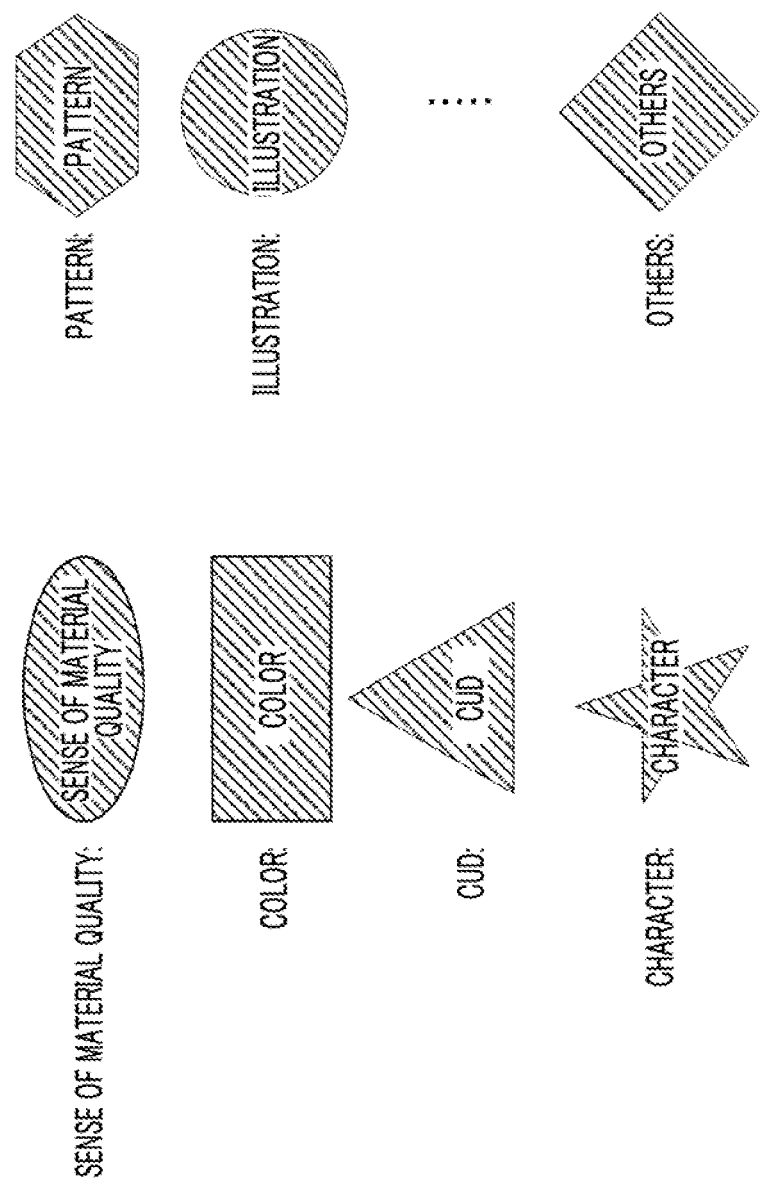
FIG. 6 is a diagram illustrating an example of case where icons of plural types which are different from each other in shape respond to types of comments.

An example of the icon corresponding to the type of the comment is illustrated in FIG. 5 and FIG. 6.

FIG. 5 is a diagram illustrating an example of case where the icons of plural types which are different from each other in coloration respond to the types of the comments. In an example of the icon illustrated in FIG. 5, the icons of plural types which are different from each other in coloration, and are the same in shape are arranged in correspondence to the types of the comments. In FIG. 5, a difference of the coloration is expressed by a difference of a filling pattern, and the difference of the coloration is similarly expressed in the following description.

For example, in the example of FIG. 5, the icon of blue color is arranged in correspondence to the type of the comment referred to as "sense of material quality". Moreover, the icon of red color is arranged in correspondence to the type of the comment referred to as "color".

As icons of plural types which are set in advance in correspondence to the type of the comments, it is possible to use not only the icons of plural types which are different from each other in coloration, but also the icons of plural types which are different from each other in shape. Furthermore, it is also possible to set the icons of plural types by a combination of coloration and shape, and to cause the icons of plural types to respond, to the types of the comments.

For example, an example of case where the icons of plural types which are different from each other in shape respond to the types of the comments is illustrated in FIG. 6. The example illustrated in FIG. 6 is an example of the icons of plural types which are different from each other in shape, and are the same in coloration, and each of the shapes are configured to respond to the types of the comments.

In the following description, the case where the icons which are different from each other in coloration are set to the types of the comments as illustrated in FIG. 5 will be described.

The icon generating section 34 may change a size of the generated icon, based on the number of the characters of the input comment.

Furthermore, at the time of the input of the comment to be added into the image data by the input section 31, a degree of importance of the comment is input, and the icon generating section 34 may change the size of the generated icon, based on the degree of importance of the input comment.

Figure 7:
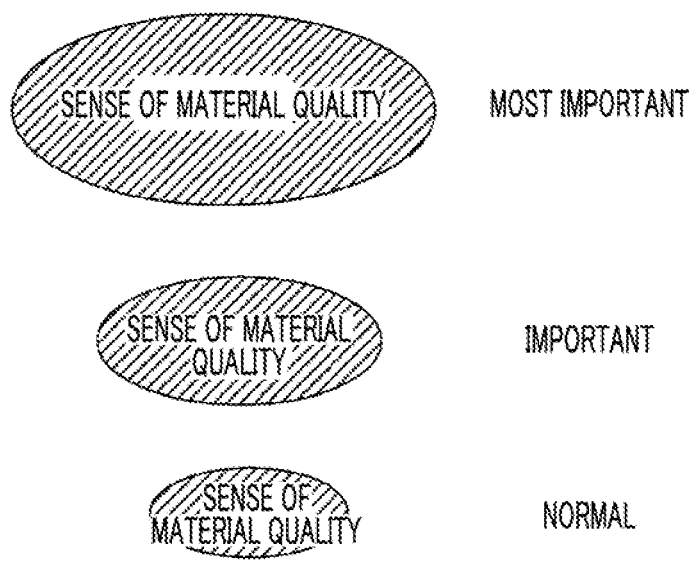
FIG. 7 is a diagram illustrating an example of case where a size of the generated icon is changed based on a degree of importance of a comment.

For example, at the time of the input of the comment, the input section 31 accepts the degree of importance of the comment from the user by selecting the degree of importance of the comment among "most important", "important" and "normal". Therefore, as illustrated in FIG. 7, at the time of the input of the comment, the icon generating section 34 generates a large icon when the degree of importance of the comment is input as "most important", and generates a moderate-sized icon when the degree of importance of the comment is input as "important", and generates a small icon when the degree of importance of the comment is input as "normal".

The icon adding section 35 adds the icon generated by the icon generating section 34 to a position which is designated in the image data. At that time, the icon adding section 35 adds the icon generated by the icon generating section 34 along with character information indicating the type of the comment selected by the comment type selecting section 33 into the image data.

Specifically, when the type of the comment referred to as "pattern" is selected by the comment type selecting section 33, the icon adding section 35 adds the icon generated by the icon generating section 34 along with the character information referred to as "pattern" to the position which is designated in the image data.

The communication section 37 performs the communication with other information processing apparatuses 10 through the network 20, and sends the image data to which the icon generated by the own information processing apparatus 10 is added to other information processing apparatuses 10, or receives the image data to which the icon sent from, other information processing apparatuses 10 is added.

The control section 36 controls the display section 38 to display the content of the comment which is set to the icon, when the image data to which the icon is added is displayed, and the icon of the displayed image data is selected.

Moreover, the control section 36 controls the display section 38 to display the icon in a display mode indicating that the comment is undisplayed, for example, a display mode of causing the icon to flicker, when the comment which is set to the icon is undisplayed.

The input section 31 may input a reply comment replying to the comment which is set to the generated icon. In this case, the icon adding section 35 adds the reply comment input by the input section 31 to the generated icon, and adds the icon to which the reply comment is added into the image data.

Moreover, the input section 31 may input the comment which is added to the generated icon. In this case, the comment type selecting section 33 reselects the type of the comment among the plural types which are set in advance, based on the content of the latest comment input by the input section 31. Therefore, the icon adding section 35 adds the icon into the image data corresponding to the type of the comment res elected by the comment type selecting section 33.

For example, when the type of the comment which is input at first is "illustration", and the type of the comment which is input next is "pattern", at the time when the comment is input at first, the icon corresponding to "illustration" is generated, and at the time when the next comment is input, the icon is changed into the icon corresponding to "pattern".

Moreover, the icon adding section 35 may add information relating to the number of comments which are set to the icon along with the icon into the image data.

Here, the comment which is set to the icon also includes the reply comment described above, and the comment added later. Therefore, when the reply comment is added to the comment which is input at first, and the next comment is added thereto, and furthermore, the reply comment is added thereto, the number of comments which are set to the icon is four. Therefore, in such a case, the icon adding section 35 adds a numeral of "4" along with the icon to the image data.

Furthermore, the input section 31 may input data which is attached to the input comment. In this case, the icon adding section 35 adds the icon where the comment to which the data input by the input section 31 is attached is set into the image data.

Next, an operation in the information processing apparatus 10 of the exemplary embodiment will be described in detail with reference to the drawings.

Figure 8:
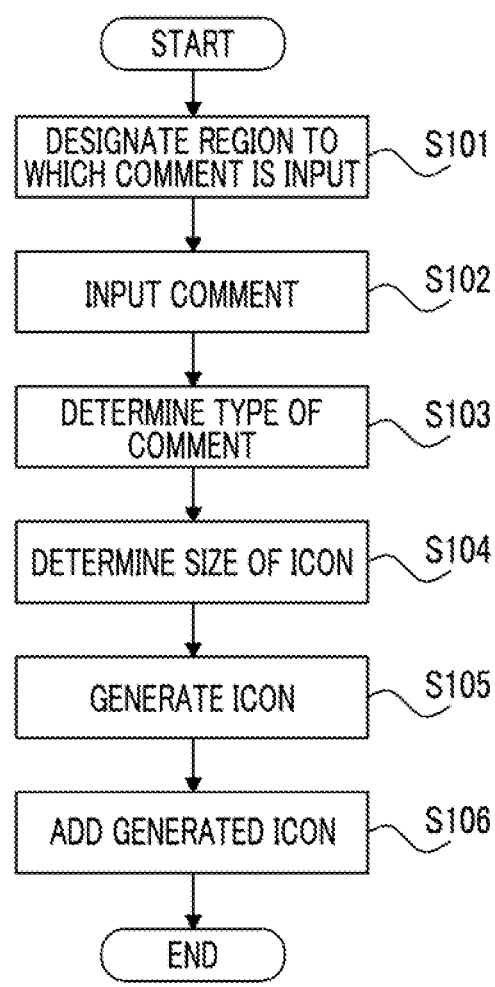
FIG. 8 is a flowchart for describing an operation at the time of inputting a comment into the information processing apparatus in the exemplary embodiment of the invention.

First, the operation at the time of the input of the comment in the information processing apparatus 10 of the exemplary embodiment will be described with reference to a flowchart of FIG. 8.

Figure 9:
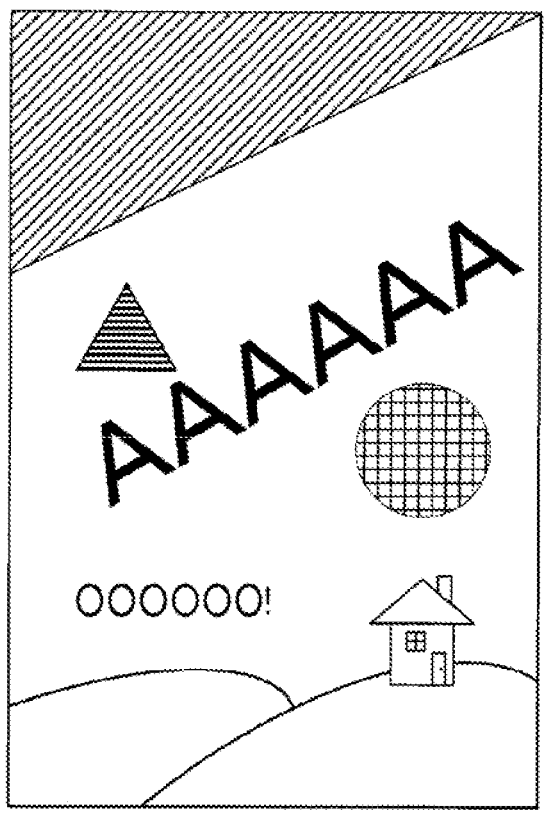
FIG. 9 is a diagram illustrating an example of a design image to which a comment is added.

In the following description, a case where the comment is added to the design image as illustrated in FIG. 9 is used, and the description will be performed.

Figure 10:
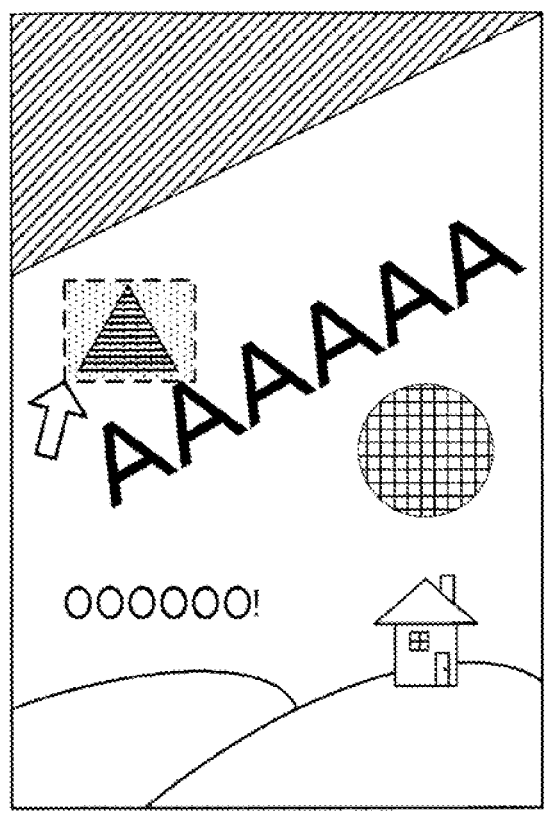
FIG. 10 is a diagram for describing a state where a region to which a comment is added is designated in the design image illustrated in FIG. 3.

First, the input section 31 accepts designation of a region to which the comment is input, in a state where the design image is displayed in the display section 38 (step S101). For example, in the example illustrated in FIG. 10, a region where a triangle-shaped graphic is drawn in the design image illustrated in FIG. 9 is designated as a region to which the comment is added.

Therefore, if the region to which the comment is added is determined, the input section 31 inputs the content of the comment which is added to the region (step S102). For example, in the example illustrated in FIG. 11, if the designation of the region to which the comment is added is completed, a comment input frame 80 is displayed to promote the input of the comment. At that time, the design image is compactedly displayed, and is displayed by being moved on an opposite side to the comment input frame 80, while the comment input frame 80 is displayed, so that the input of the comment becomes easy.

In the comment input frame 80, if the user inputs the comment, the degree of importance of the comment is selected. In the example illustrated in FIG. 11, a comment of "A little more high-grade sense is desired in texture." is input, and "important" is selected as a degree of importance.

Figure 11:
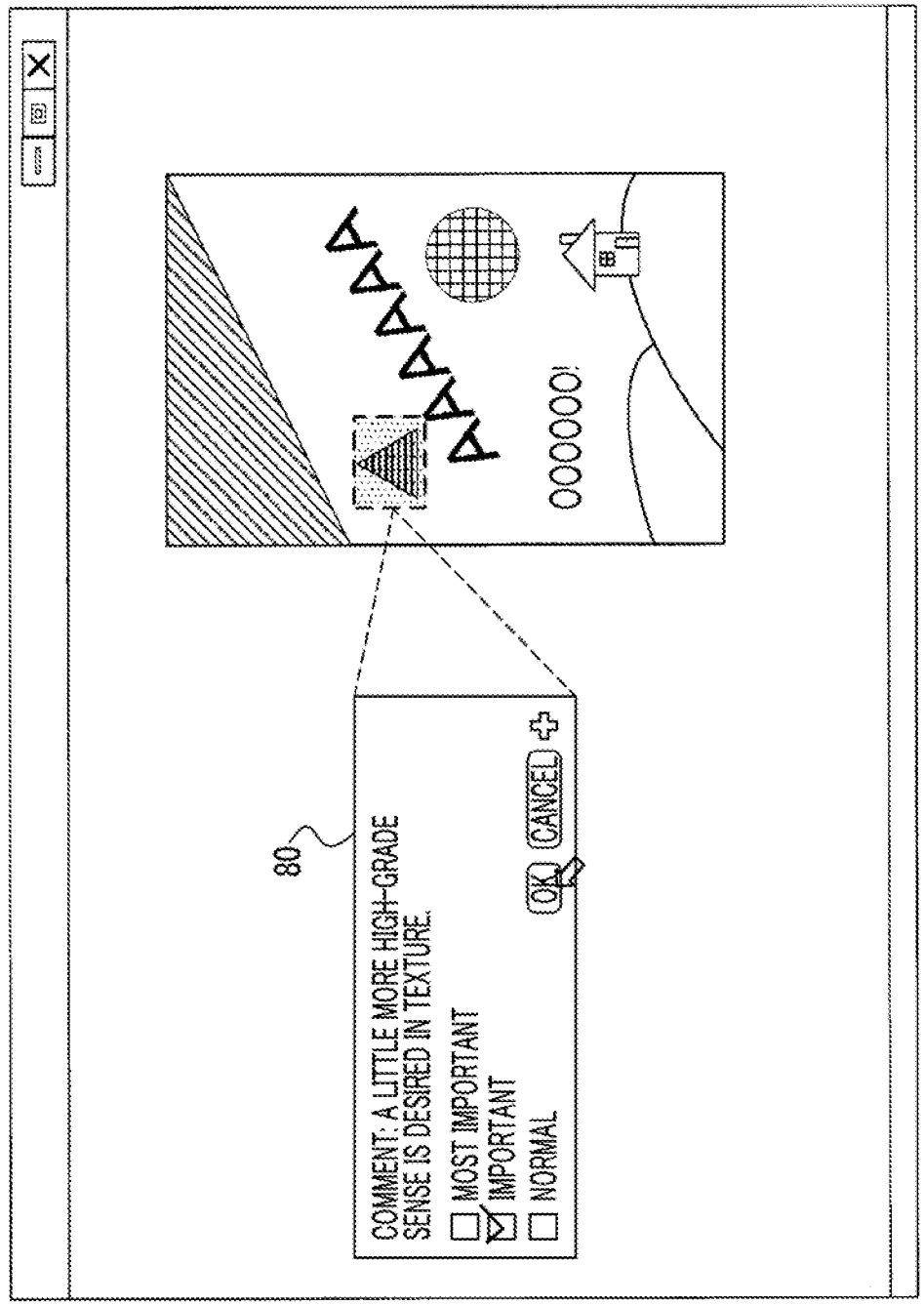
FIG. 11 is a diagram for describing a state where an input of a comment which is displayed by a comment input frame is performed, after the designation of the region to which the comment is added is completed.

Therefore, if the degree of importance along with the content of the comment are input by the comment input frame 80 illustrated in FIG. 11, and an OK button is operated, the input of the comment is ended.

Thereupon, in the comment type selecting section 33, the type of the comment is determined based on the content of the input comment (step S103). Here, since the keyword of "texture" is present in the input comment, the comment type selecting section 33 determines that the type of the comment is "sense of material quality".

The icon generating section 34 determines the size of the generated icon based on the degree of importance of the comment input by the input section 31 (step S104). Here, since "important" is input as a degree of importance of the icon, the icon generating section 34 determines that the generated icon is the moderate-sized icon.

Therefore, the icon generating section 34 generates the icon to be added, based on the type of the comment selected by the comment type selecting section 33, and the size of the determined icon (step S105).

Figure 12:
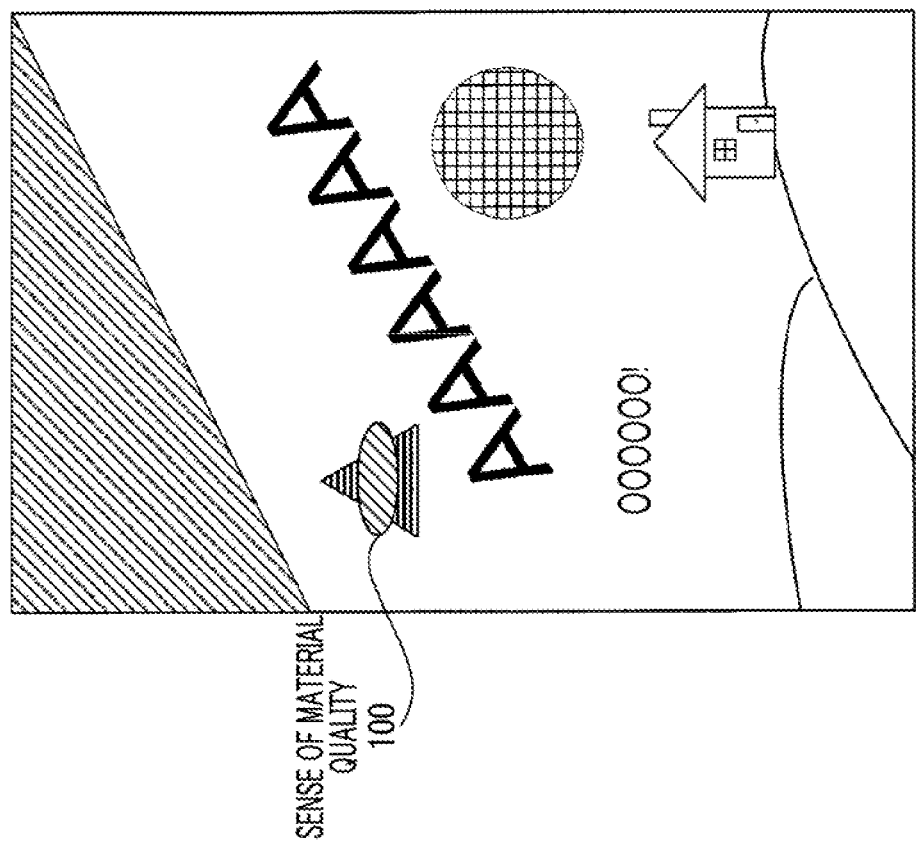
FIG. 12 is a diagram illustrating a state where the generated icon is added to a position which is designated in the design image.

The icon generated by the icon generating section 34 is added to the position which is designated in the image data by the icon adding section 35, for example, as illustrated in FIG. 12 (step S106).

FIG. 12 is a diagram illustrating an example of case where the icon is added in this manner, and it is found out that an icon 100 in which the characters of "sense of material quality" are displayed in the design image is added onto the triangle-shaped graphic to which the icon is designated to be added.

Figure 13:
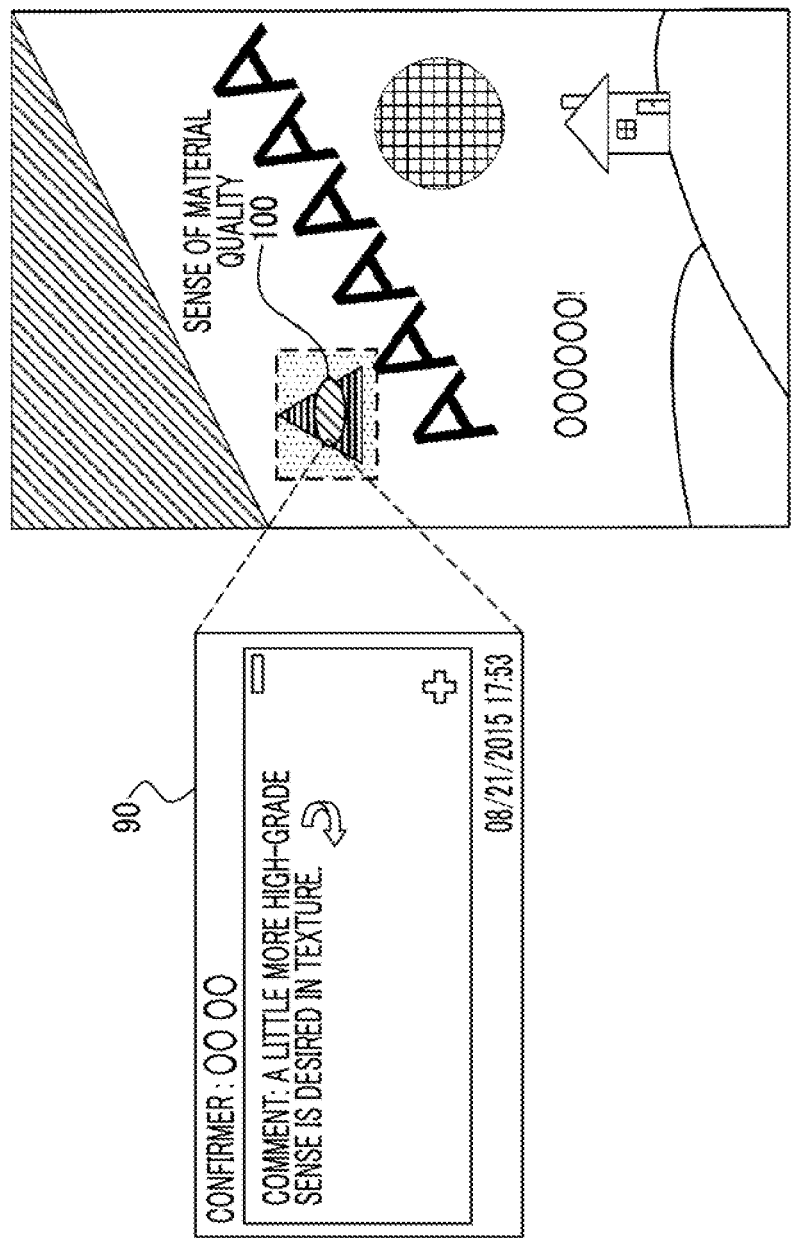
FIG. 13 is a diagram illustrating a display example of case where image data to which the icon is added is displayed, and the icon is selected.

Next, a display example of case where another user who receives the image data of the design image to which the icon is added in this manner causes the design image to be displayed in the display section 38, and selects the icon 100 in order to see the content of the comment is illustrated in FIG. 13.

In another information processing apparatus 10 that receives the image data of the design image to which the icon is added, the control section 36 displays the image data to which the icon is added in the display section 38. When the user who sees the image performs the operation such as a double click on the icon 100 so as to see the content of the comment which is set to the icon 100, as illustrated in FIG. 13, a comment display frame 90 is displayed, and the content of the comment which is set to she icon 100 is displayed.

Therefore, the content of the comment is displayed, and the region to which the comment is added is displayed by an oblique line and the like, and thereby indicating that the content of the comment relates to what region. In the displayed comment display frame 90, date and time of the input of the comment, and the information of a person who inputs the comment are displayed. By clicking on a horizontally long bar-shaped icon on an upper right, side of the comment display frame 90, the comment display frame 90 is closed, and is returned to an original state.

As a region to which the comment is added, it is possible not only to specify a portion of the design image, but also to select the whole of the design image. In this case, it is possible to select the whole of the design image by clicking on a portion of the design image at the time of the input of the comment.

Figure 14:
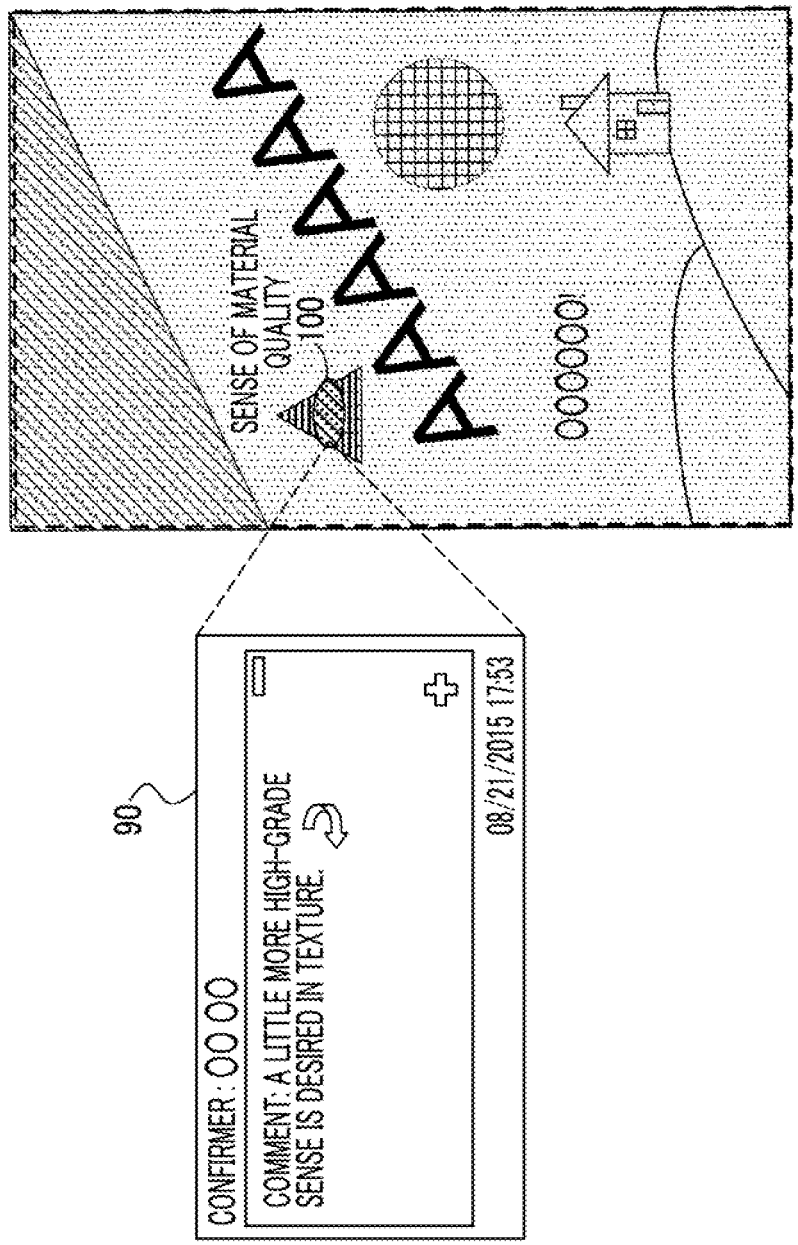
FIG. 14 is a diagram illustrating a display example of case where a comment target region is a whole region of the design image, at the time of displaying a content of the comment by selecting the icon.

When the whole of the design image is selected, the comment is input, and the icon is added, if the icon is selected, as illustrated in FIG. 14, the oblique line and the like are arranged in the whole of the design image, and the display of the content of the comment. Therefore, the user who sees the comment may understand that a comment target region is the whole of the design image.

Furthermore, when the comment type selecting section 33 determines the type of the comment based on the input comment, when the keywords corresponding to the comments of plural types are included in the input comment, the comment type selecting section 33 may determine the type of the comment based on the keyword which is written in the comment at first.

Alternatively, when the keywords corresponding to the comments of plural types are included in the input comment, the types of the comments corresponding to the included keywords are represented to the user, and the user may select the type of the comment among the represented types of the comments.

Figure 15A:
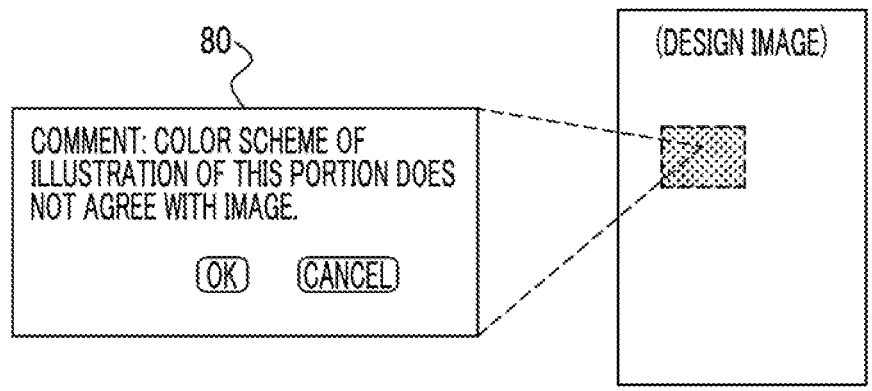
FIGS. 15A, 15B and 15C are diagrams for describing a state where the type of the icon is selected in case that the keywords corresponding to two types of comments are included in the input comment.

For example, as illustrated in FIG. 15A, the description will be performed by using a case where a comment of "Color scheme of illustration of this portion does not agree with image." is input by the user. In the input comment, the word referred to as "illustration" corresponding to the type of the comment of "illustration", and the word referred to as "color scheme" corresponding to the type of the comment of "color" are included.

Figure 15B:
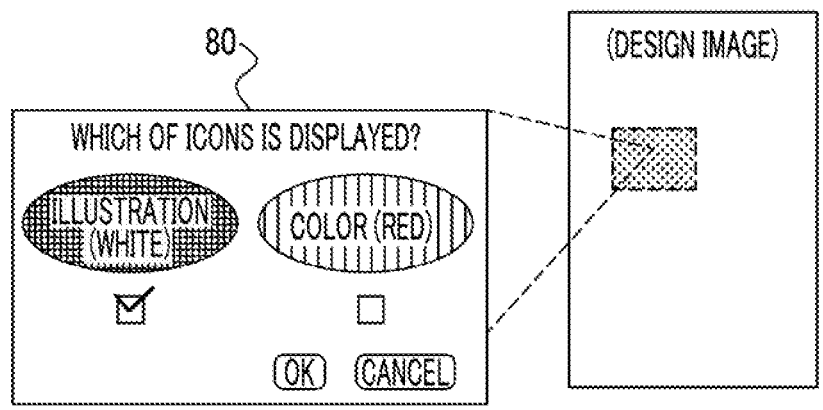

Therefore, the comment type selecting section 33 selects two types of the comments referred to as "illustration" and "color", and represents two types of the comments to the user by a display screen as illustrated in FIG. 15B. For example, the user selects "illustration" among the represented two types of the comments, and selects a check box corresponding to the icon of "illustration".

Figure 15C:
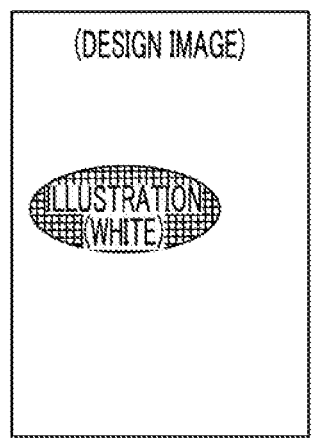

Thereupon, as illustrated in FIG. 15C, the icon corresponding to the type of the comment of "illustration" is generated, and is added to the position which is designated in the design image.

On the contrary, when any keyword corresponding to the type of the comment is not included in the input comment, the comment type selecting section 33 selects "others" as a type of the comment.

Figure 16A:
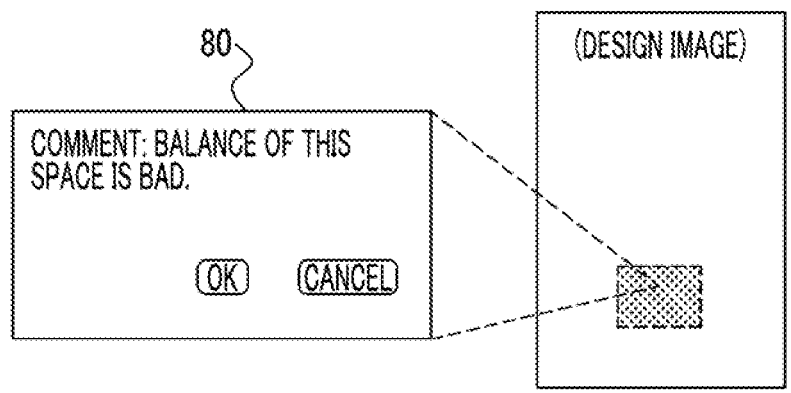
FIGS. 16A and 16B are diagrams for describing a state where the type of the icon is selected when the keywords corresponding to the type of the comment are not included in the input comment.

For example, as illustrated in FIG. 16A, the description will be performed by using a case where a comment of "Balance of this space is bad." is input by the user. In the input comment, any keyword corresponding to the type or the comment is not included.

Figure 16B:
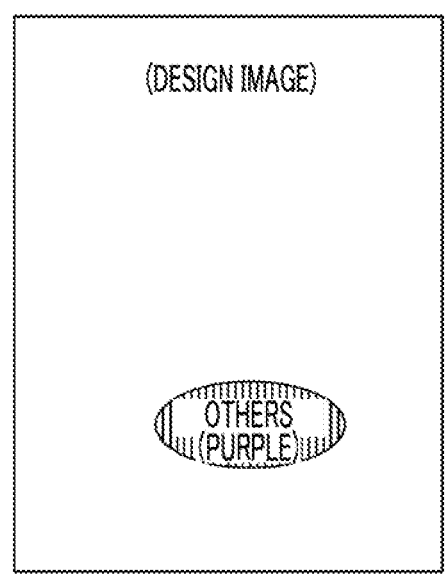

Therefore, the comment type selecting section 33 selects "others" as a type of the comment type. As illustrated in FIG. 16B, the icon corresponding to the type of the comment of "others" is generated, and is added to the position which is designated in the design image.

In the exemplary embodiment, it is possible to attach file data such as a modified version, of the design image to the comment. Therefore, an operation of a case where an attached file is added to the comment will be described with reference to FIG. 17.

Figure 17:
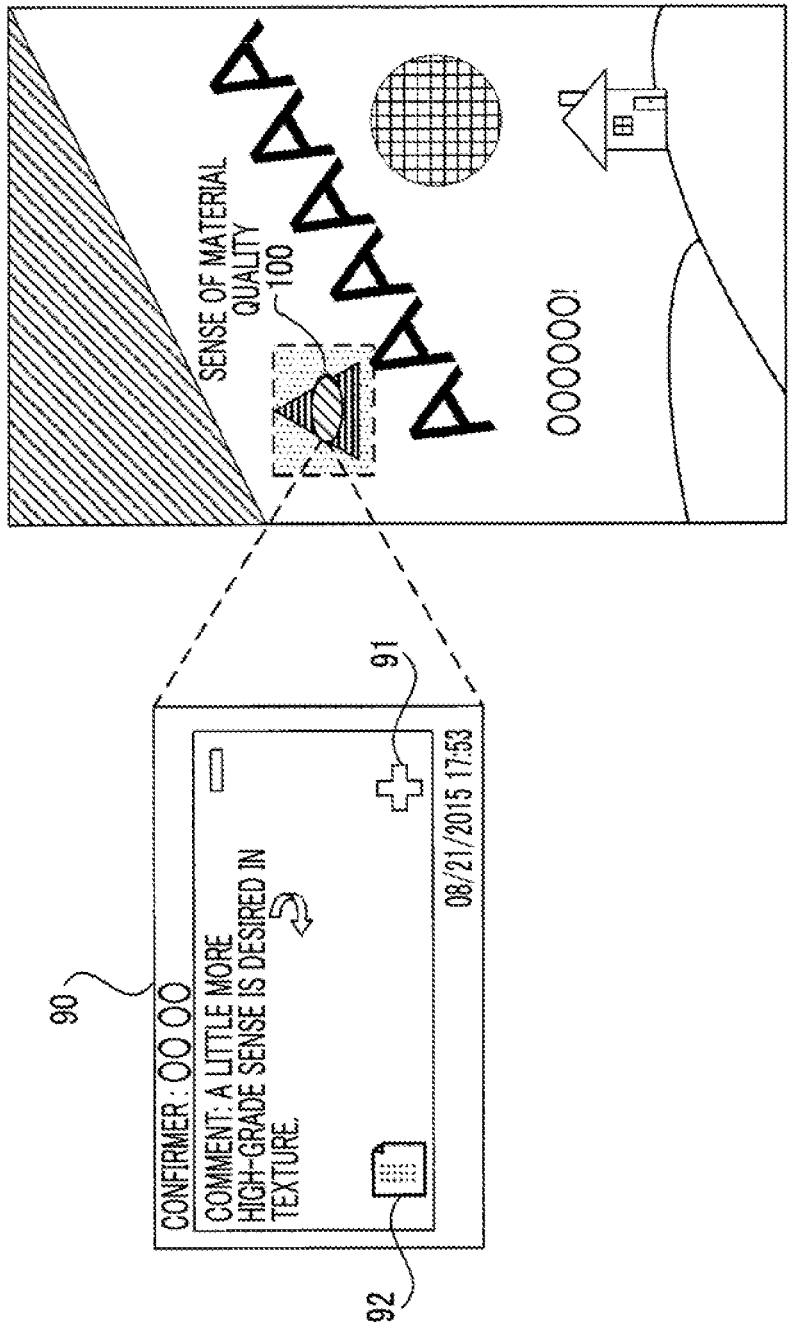
FIG. 17 is a diagram for describing an operation of case where an attached file is added to the comment.

As illustrated in FIG. 17, in the comment display frame 90, an additional selection icon 91 of a cross shape is displayed. The user who wants to add the attached file to the comment specifies the attached file data by selecting the additional selection icon 91.

Thereupon, the attached file is added to the comment, and an attached file icon 92 indicating that the attached file is added as illustrated in FIG. 17 is displayed in the comment display frame 90. Furthermore, it is possible to perform the addition of the attached file, and the input of the comment at the same time.

When it is necessary to confirm the content of the attached file, if is possible to display the content of the file by the selection of the attached file icon such as clicking on the attached file icon 92, or it is possible to perform the operation of storing the file in the own device by copying the file.

In the information processing apparatus 10 of the exemplary embodiment, it is possible to add the reply comment to the displayed comment, or it is possible to further add another comment to the comment which is input earlier.

Figure 18:
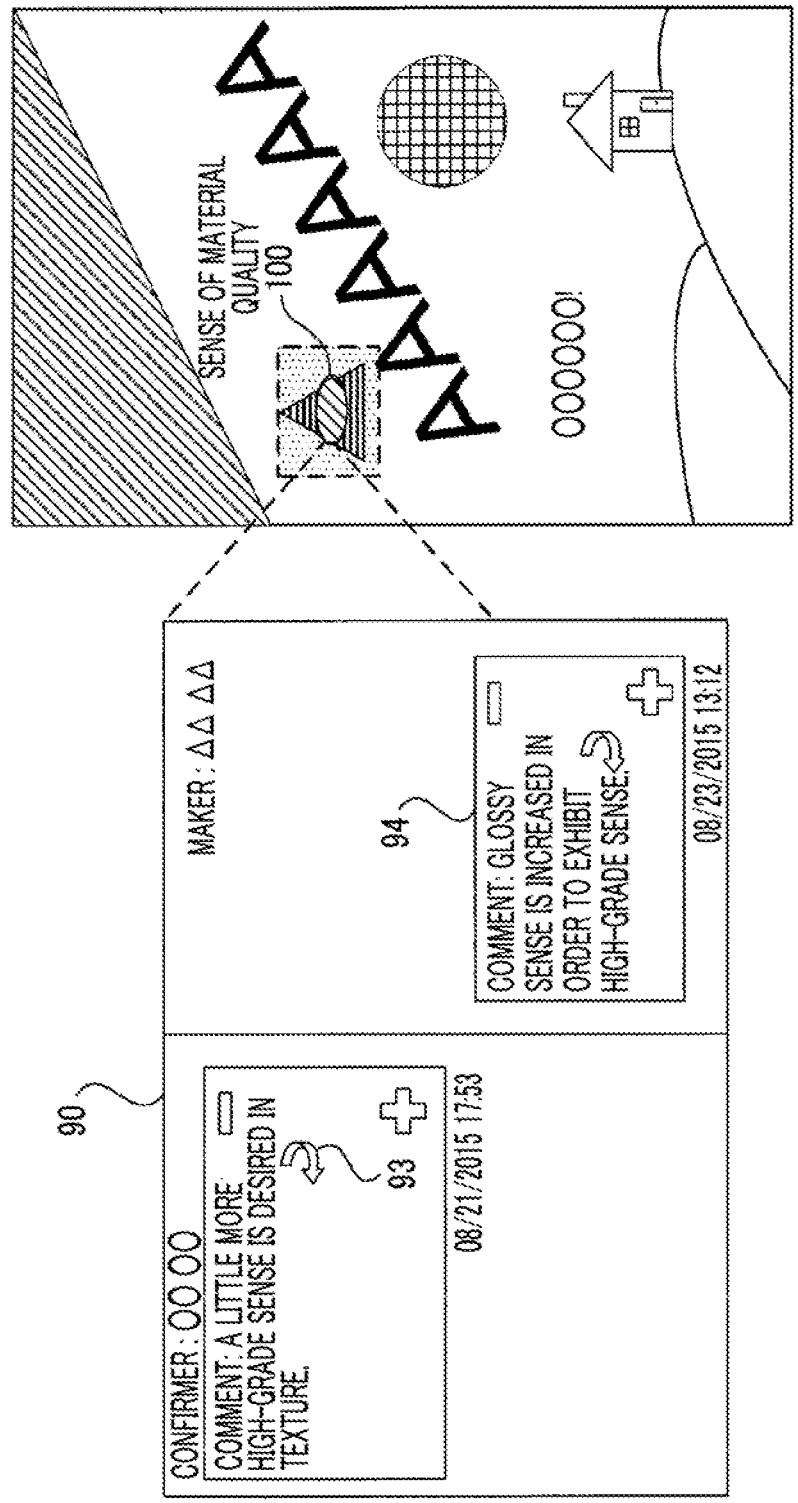
FIG. 18 is a diagram illustrating a display example of case where a reply comment is added to the displayed comment.

A display example of case where the reply comment is added to the displayed comment is illustrated in FIG. 18, and a display example of case where the comment is further added to case to which the reply comment is added is illustrated in FIG. 19.

In the display example illustrated in FIG. 18, a display screen example of case where a maker operates a comment reply icon 93 of the comment which is input by a confirmer, and the reply comment is added is illustrated. In FIG. 18, it is found out that a reply comment of "Glossy sense is increased in order to exhibit high-grade sense." which is input by the maker is displayed in the comment display frame 94.

Moreover, in the display example illustrated in FIG. 19, a display screen example of case where the confirmer operates the comment reply icon 95 in the comment display frame 94, and the comment is further replied to the reply comment which is input by the maker is illustrated. In FIG. 19, it is found out that a reply comment of "Modified version is confirmed. High-grade sense as desired is made." which is input by the confirmer is displayed in a comment display frame 96.

In this manner, in the information processing apparatus 10 of the exemplary embodiment, when plural comments are input to one icon, it is possible to simply visualize the contents of the comments along a time series interactively. Therefore, even when the contents of the comments are displayed, it is easy grasp how the exchange is performed.

In this manner, in the information processing apparatus 10 of the exemplary embodiment, the icon of the coloration corresponding to the type of the content of the comment is arranged at the position which is designated in the image data. Therefore, it is easy to grasp which icon relates to what comment, even when many comments are added into one image data.

A display screen example of case where plural icons are added into one design image in this manner is illustrated in FIG. 20. In the display screen example illustrated in FIG. 20, in order to easily see the added icon, the design image is omitted without being displayed.

FIG. 20 illustrates the case where three icons 101 to 103 are added into the design image. Referring to FIG. 20, it is found out that the icon 101 has a shape which is largely displayed, and the degree of importance is set high.

Moreover, the icon 102 is displayed in a flickering manner, and thereby, it is found out that, the content of the comment is unread. In the icon 102, a numeral of "2" along with the characters of "illustration" indicating the type of the comment are displayed, and thereby, it is found put that the set number of comments is two.

In the icon 103, the number of comments is four, and the icon is displayed so as to find out that the comment relating to "color" is set.

According to the exemplary embodiment, the user may grasp the type of the content of the comment, or the degree of importance by the differences in coloration or size of the icon. Moreover, the user may grasp that the content of the comment of the icon is unread fey the flickering of the icon, or grasp the set number of comments by the displayed numeral.

MODIFICATION EXAMPLE

In the above exemplary embodiment, the case where the comment type selecting section 33 selects the type of the comment, based on whether or not the keyword stored by the keyword storing section 32 is included in the comment input by the input section 31 is described, but the invention is not limited to the configuration. For example, the comment type selecting section 33 may analyze a semantic content of the comment, and select the type of the comment, by executing a natural language analysis on the comment input by the input section 31.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enacting others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor programmed to:
    store a plurality of types of comments in a memory, each type of comment being stored in correspondence with one or more keywords for specifying each type of the comment;
    accept a designation, in an image, of a region in the image to which a comment is added by input of a user;
    after the region is designated, display a comment input frame to prompt the input of the comment, and move the image such that the image and the comment input frame are at opposite sides;
    accept the comment input by the user into the comment input frame;
    when the comment includes any of the keywords corresponding to the plurality of types of comments, select a type of comment, from the plurality of types comments, that corresponds to the keywords included in the comment input by the user,
    wherein selecting the type of the comment comprises analyzing a semantic content of the comment, and selecting the type of the comment by executing a natural language analysis on the comment input by the user;
    when the comment does not include any of the keywords corresponding to the plurality of types of comments, select a type of comment other than the plurality of types of comments stored in the memory;
    generate a pattern graphic corresponding to the selected type of the comment, the pattern graphic being a first pattern graphic,
    wherein generating the pattern graphic comprises changing a size of the generated pattern graphic based on the number of characters of the input comment;
    when a type of a new comment that is entered in reply to the comment entered by the user is different from the selected type of the comment, change the first pattern graphic into a second pattern graphic corresponding to the type of the new comment,
    wherein the first pattern graphic is replaced with the second pattern graphic; and
    display the second pattern graphic corresponding to the type of the new comment, without displaying the first pattern graphic.

2. The information processing apparatus according to claim 1,
wherein the user inputs a degree of importance of the comment input by the user, and
generating the pattern graphic comprises changing a size of the generated pattern graphic based on the degree of importance of the input comment.

3. The information processing apparatus according to claim 1, wherein the processor is further programmed to:

display a content of the comment which is set to the pattern graphic, when image information or document information to which the pattern graphic is added is displayed, and the pattern graphic of the displayed image information or the displayed document information is selected.

4. The information processing apparatus according to claim 3, wherein the processor is further programmed to:
display the pattern graphic in a display mode indicating that the comment is not displayed, when the comment which is set to the pattern graphic is not displayed.

5. The information processing apparatus according to claim 1, wherein the processor is further programmed to:
reselect the type of the comment from the plurality of types which are set in advance based on a content of a latest comment input by a user, and
generate the pattern graphic corresponding to the type of the comment reselected based on the content of the latest comment.

6. The information processing apparatus according to claim 1, wherein the processor is further programmed to:
display information relating to a number of comments which are set to the pattern graphic along with the pattern graphic.

7. The information processing apparatus according to claim 1, wherein the processor is further programmed to:
receive data which is attached to the comment input by the user, and
display the pattern graphic in which the comment to which the received data is attached.

8. The information processing apparatus according to claim 1,
wherein a plurality of types of pattern graphics that are set in advance in correspondence to types of comments are a plurality of types of pattern graphics that are different to each other in coloration or shape.

9. The information processing apparatus according to claim 1, wherein the processor is further programmed to:
display the generated pattern graphic along with character information indicating the type of the comment selected.

10. The information processing apparatus according to claim 1,
wherein changing the pattern graphic comprises changing the first pattern graphic to the second pattern graphic when displaying the new comment, the new comment being input by a person who is different from the user who input the comment corresponding to the first pattern graphic.

11. A method for processing information, the method comprising:
storing, in a memory, a plurality of types of comments, each type of comment being stored in correspondence with one or more keywords for specifying each type of the comment;
accepting a designation, in an image, of a region in the image to which a comment is added by input of a user;
after the region is designated, displaying a comment input frame to prompt the input of the comment, and moving the image such that the image and the comment input frame are at opposite sides;
accepting the comment input by the user into the comment input frame;
when the comment includes any of the keywords corresponding to the plurality of types of comments, selecting a type of comment, from the plurality of types of comments, that corresponds to the keywords included in the comment input by the user,
wherein selecting the type of the comment comprises analyzing a semantic content of the comment, and selecting the type of the comment by executing a natural language analysis on the comment input by the user;
when the comment does not include any of the keywords corresponding to the plurality of types of comments, selecting a type of comment other than the plurality of types of comments stored in the memory;
generating a pattern graphic corresponding to the type of the selected comment, the pattern graphic being a first pattern graphic,
wherein generating the pattern graphic comprises changing a size of the generated pattern graphic based on the number of characters of the input comment;
when a type of a new comment that is entered in reply to the comment entered by the user is different from the selected type of the comment, changing the first pattern graphic into a second pattern graphic corresponding to the type of the new comment,
wherein the first pattern graphic is replaced with the second pattern graphic; and
displaying the second pattern graphic corresponding to the type of the new comment, without displaying the first pattern graphic.

* * * * *